United States Patent Office 3,685,998
Patented Aug. 22, 1972

3,685,998
PROTEIN CROSS-LINKED WITH POLYMERIZED
UNSATURATED CARBOXYLIC ACID
Robert E. Miller, Ballwin, Mo., assignor to
Monsanto Company, St. Louis, Mo.
No Drawing. Filed Oct. 27, 1970, Ser. No. 84,480
Int. Cl. A23k 1/18; A23j 3/00
U.S. Cl. 99—2 R
6 Claims

ABSTRACT OF THE DISCLOSURE

Improved protein feed material for ruminants which is resistant to digestive breakdown in the rumen but not in the abomasum and/or intestines which comprises the reaction product of a protein-containing feed material and a polymerized unsaturated carboxylic acid or anhydride. Exemplary of such polymers are ethylene maleic anhydride copolymer and polymaleic anhydride homopolymer.

BACKGROUND OF THE INVENTION

Field of the invention

This invention relates to a method for improving the feed utilization of ruminant animals. In a particular aspect this invention relates to a method for improving protein utilization in ruminant animals. In a further aspect this invention relates to modified protein feed compositions useful in ruminant nutrition which are resistant to digestive attack in the fluid medium of the rumen.

Description of the prior art

The digestive system of the ruminant animal (cattle, sheep, bison, camels, etc.) is designed to permit efficient use of coarse, fibrous foodstuffs. Because of its particular structure and nature, however, the ruminant's digestive system is inefficient in obtaining nutritional value from protein materials. Principally for this reason it is common practice in ruminant nutrition to supplement the diet of the animal with added protein. The supplemental protein serves to increase the rate of growth of the animal and in the case of sheep promotes wool growth.

The rumen, the largest of the four stomach compartments of the animal, serves as an important location for digestive breakdown of ingested foodstuffs chiefly through the action of microorganims present therein. However, absorption of most nutrients for metabolic purposes does not occur in the rumen but takes place further along in the alimentary tract, principally in the abomasum and intestines. Ingested food is typically retained in the rumen for from about 12–30 hours during which time it is subject to digestive breakdown by the microorganisms and by the rumen fluid. Much ingested protein material is broken down in the rumen to soluble peptides and amino acids. In turn much of these peptides and amino acids are utilized by the microorganisms present in the rumen fluid thereby removing them as a source of nutrition for the host animal.

Because of the desirability as indicated above of avoiding protein breakdown in the rumen in order to permit absorption in the abomasum and intestines it has been suggested that nutrient protein-containing materials fed to ruminants be treated so as to permit passage without digestive breakdown through the rumen to the abomasum. Suggested procedures have included coating the protein material, for example, with fats and vegetable oils, heat treatment of the protein material and reaction of the protein material with formaldehyde. In any event the treated material must be resistant to digestive breakdown in the rumen fluid, which is a fluid buffered at about pH 6–7 by phosphate-bicarbonate from saliva and carbon dioxide, but subject to breakdown in the acid medium of the fluid of the abomasum which has a pH, due principally to hydrochloric acid secretion, of bout 2–4.

OBJECTS

It is an object of the present invention to provide a method for improving the feed utilization of ruminant animals.

It is a further object of the present invention to provide a method for improving the protein utilization of ruminant animals whereby protein passes through the rumen without substantial digestive breakdown.

Other objects and advantages of the present invention will be apparent from the specification and appended claims.

SUMMARY OF THE INVENTION

It has been found in accordance with the present invention that the protein utilization of the ruminant animal is improved by feeding the animal a reaction product of a protein-containing nutrient material and a polymerized unsaturated carboxylic acid or anhydride (hereinafter sometimes referred to as "polymer").

The amount of polymer in the reaction product is sufficient to prevent substantial digestive breakdown in the fluid medium of the rumen but insufficient to prevent digestive breakdown in the fluid media of the abomasum and of the intestines.

DETAILED DESCRIPTION

The protein-containing reaction product used in the method of the present invention is the reaction product of a protein-containing nutrient feed material and a polymerized unsaturated carboxylic acid or anhydride. Included among the polymers suitable for use in the present invention are those of the following general formula

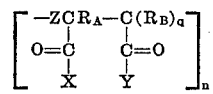

wherein Z is hydrogen or a bivalent radical containing, for example, 1–18 carbon atoms and preferably 1–4 carbon atoms such as alkylene, phenylalkylene, alkoxyalkylene and aliphatic acyloxyalkylene; X and Y individually are hydroxyl, X and Y taken together is —O—; $R_A$ and $R_B$ are hydrogen, alkyl of 1 to 4 carbon atoms (preferably methyl) or phenyl, provided that not more than one of $R_A$ and $R_B$ is phenyl; and $q$ is 1 or 2. The units of the formula given above are recurring, $n$ being at least 8 and can be as much as 100,000 degrees of polymerization. When the units are recurring, the symbols in the various recurring units do not necessarily stand for the same thing in all of the recurring units. Specific examples of polymers useful in the present invention include polymaleic anhydride homopolymer, ethylene maleic anhydride copolymer, isobutylene maleic anhydride copolymer, 2-methylpentene-1 maleic anhydride copolymer, styrene maleic anhydride copolymer, ethylene citraconic anhydride copolymer, itaconic anhydride homopolymer, ethylene maleic acid copolymer, etc.

The protein-containing nutrient material can be from any suitable source including animal, plant, or synthetic sources such as, for example, silage, grains, nuts, chaffs, casein, soy bean meal, fish meal, peanut meal, beef scraps, pork scraps, linseed meal, milk solids, etc.

The useful reaction products of the present invention are prepared by the interaction of polymerized unsaturated carboxylic acid or anhydride and protein nutrient material by any suitable procedure. The reaction is readily carried out in a suitable solvent medium, such as ketones, for example, acetone and methyl ethyl ketone and organic acids, for example, formic acid and acetic acid. The reaction may be carried out at any suitable temperature, however, elevated temperatures above about 70° C. particularly for extended periods should be avoided to minimize degradation of protein material. Temperatures in the range of from about 10 to about 40° C. are typically employed with room temperature being both suitable and practical. The reaction is preferably carried out simply by forming a slurry of the reactants in the solvent medium and agitating, as by stirring, the slurry thereby to permit sufficient reaction of the protein with the polymerized unsaturated carboxylic acid or anhydride. The thus treated protein is filtered, washed and then dried as by oven drying, drum drying, or simple evaporation to recover the modified protein nutrient material.

It is important in order to insure operability of the present invention that the amount of polymer incorporated into the protein be sufficient to prevent digestive breakdown to soluble peptides and amino acids in the rumen but insufficient to prevent digestive breakdown to soluble peptides and amino acids in the abomasum and intestines. This amount will, of course, vary and will depend among other things on the particular protein material, the particular polymer of choice, the molecular weight of the polymer, the pH of the solvent of reaction, time and temperature of reaction, the species and age of the animal, and the total makeup of the animal diet. Typically an amount in the range of from about 0.000001 to about 0.001 mole of polymer for each gram of protein contained in the protein material is employed.

It is to be understood that the modified ruminant protein feed of the present invention can be fed separately to the animal or it can be used for incorporation in other ruminant feed materials. Illustrative of ruminant feed materials in which the protein material of the present invention may be incorporated are soy bean meal, ground corn, hay, straw, cotton seed hulls, cotton mill waste, feed pulp, silage, oats, barley, cereal, brans, cereal middlings and combinations thereof. If desired other components, for example, minerals, such as bone meal, salt, and trace minerals, antibiotics and vitamins may be included in the animal feed ration.

The following examples illustrate the effectiveness of polymerized unsaturated carboxylic acid or anhydride compositions useful in the present invention in protecting protein-containing material from digestion in the fluid of the rumen while permitting digestion in the fluids of the abomasum and intestines. The small scale in vitro experiments shown in the examples simulate conditions existing in the rumen, in the abomasum and in the intestines thereby permitting the study of treated protein without the use of the live animal and large quantities of feed materials. It is understood that the examples are presented for the purpose of illustration only and the invention is not limited to the compositions or methods shown therein.

EXAMPLE 1

Preparation of treated protein

Casein (5.0 grams) was added to a solution of polymaleic anhydride (1.49 grams) in 88% formic acid (50 milliliters). The resulting mixture was stirred for about 6 hours at room temperature to permit reaction of the polymaleic anhydride with casein. The solution was neutralized with base, the solids filtered, washed with water and dried to obtain protein product containing 0.0002 mole of polymaleic anhydride per gram of casein.

Rumen digestion test

To 10 milliliters of rumen fluid from fasted sheep contained in a 50 milliliter glass flask was added 10 milliliters of a buffered solution of the following composition.

Buffer solution in grams per liter

| | |
|---|---|
| $NaH_2PO_4$ | .316 |
| $KH_2PO_4$ | .152 |
| $NaHCO_3$ | 2.260 |
| $KCl$ | .375 |
| $MgSO_4$ | .112 |
| $NaCl$ | .375 |
| $CaCl_2$ | .038 |
| $FeSO_4 \cdot 7H_2O$ | .008 |
| $MnSO_4$ | .004 |
| $ZnSO_4 \cdot 7H_2O$ | .004 |
| $CuSO_4 \cdot 5H_2O$ | .002 |
| $CoCl_2$ | .001 |

The resulting mixture was adjusted to pH 6.8 (4 N hydrochloric acid). To the buffered rumen fluid was added 100 milligrams of the polymaleic anhydride treated protein prepared above. The flask was then purged with nitrogen, stoppered (pressure release valve) and heated at 38° C. on a water shaker bath. Protection of protein from digestion was determined by ammonia production with a lower amount of ammonia production indicating a lower amount of digestion of protein. Ammonia production was determined after 6 hours and after 24 hours with results being presented in Table 1.

Abomasum digestion test

Gastric fluid was prepared as follows: NaCl (2 grams) was dissolved in sufficient water to give a total volume of 950 milliliters. Pepsin (3.2 grams) was added thereto. Concentrated hydrochloric acid (7 milliliters) was added to the resulting medium and the pH of the medium was then adjusted to 2.0 with aqueous sodium hydroxide.

To a glass flask containing 20 milliliters of the gastric fluid were added 60 milligrams of polymaleic anhydride treated casein prepared above. The glass flask containing the resulting mixture was stoppered with pressure release valves and heated at 38° C. on a water shaker bath for 2 hours. Digestion of protein was then determined by ammonia analysis, the greater amount of ammonia produced the greater the amount of protein digested. The results are given in Table 1.

Intestine digestion test

Intestinal fluid was prepared as follows: NaCl (2 grams) was dissolved in sufficient water to give a total volume of 950 milliliters. Pepsin (3.2 grams) was added thereto. Concentrated hydrochloric acid (7 milliliters) was added to the medium and the pH of the medium was then adjusted to 7.0 with 0.1 N sodium hydroxide. Pancreatin (10 milligrams per milliliter of medium) was added to the resulting medium.

To a glass flask containing 20 milliliters of the intestinal fluid were added 60 milligrams of polymaleic anhydride treated casein prepared above. The glass flask was stoppered with pressure release valves and heated at 38° C. on a water shaker bath, for the prescribed period of time. Digestion of protein was determined by ammonia analysis, the greater amount of ammonia produced the greater amount of protein digested. The results are given in Table 1.

EXAMPLES 2–8

Following the general procedures and tests of Example 1 polymer treated casein samples were prepared and tested. The results are given in Table 1.

In the same manner other protein-containing materials may be reacted with polymerized unsaturated carboxylic acids and anhydrides to protect the protein material from digestive breakdown in the rumen while permitting its digestion in the abomasum.

EXAMPLE 9

Styrene maleic anhydride copolymer treated casein containing 0.00005 mole styrene maleic anhydride per gram of protein is resistant to digestion in the rumen but is readily digested in the abomasum.

Since many embodiments of this invention may be made and since many changes may be made in the embodiments described, the foregoing is to be interpreted as illustrative only and the invention is defined by the claims appended hereto.

TABLE 1

| Ex. No. | Polymer | Solvent of preparation | Moles polymer/ gram casein | Percent total protein digested | | | | |
|---|---|---|---|---|---|---|---|---|
| | | | | Ammonia N rumen | | Ammonia N abomasum, 2 hrs. | Ammonia N intestine | |
| | | | | 6. hrs.[1] | 24 hrs. | | 4 hrs. | 20 hrs. |
| 1 | Polymaleic anhydride | Formic acid | 0.0002 | 71 | 14.3 | 84 | 108 | 97 |
| 2 | do | do | 0.0006 | 30 | 9.0 | 30 | 63 | 86 |
| 3 | do | Water (pH 9.0) | 0.0003 | 74.5 | 100 | | | |
| 4 | do | Formic acid | 0.00008 | 38.7 | 42.1 | 80 | 87 | 108 |
| 5 | Ethylene/maleic anhydride | Acetic acid | $5.0 \times 10^{-5}$ | 19.6 | 5.4 | 9.7 | 53 | 42 |
| 6 | do | do | $5.0 \times 10^{-5}$ | 50.9 | 64.8 | | | |
| 7 | do | Aqueous alkali | $1.4 \times 10^{-5}$ | 68.8 | 79.9 | | | |
| 8 | do | Formic acid | $1.2 \times 10^{-5}$ | 16 | 46 | 18 | 20 | 32 |

[1] Due at least in part to decomposition of rumen microorganisms.

I claim:

1. A method for improving the portein utilization of ruminant animals which comprises feeding the ruminant animal the reaction product of a protein-containing nutrient feed material and a polymerized unsaturated carboxylic acid or anhydride capable of crosslinking the protein, the amount of polymerized unsaturated polycarboxylic acid or anhydride in said reaction product being sufficient to render said feed material resistant to digestive breakdown in the fluid of the rumen but insufficient to prevent substantial digestive breakdown in the fluids of the abomasum and of the intestines.

2. The method of claim 1 wherein the polymerized unsaturated carboxylic acid or anhydride is a homopolymer.

3. The method of claim 2 wherein the homopolymer is polymaleic anhydride.

4. The method of claim 1 wherein the polymerized unsaturated carboxylic acid or anhydride is a copolymer.

5. The method of claim 4 wherein the copolymer is a copolymer of (a) an unsaturated monomer having 1 to 18 carbon atoms and (b) maleic acid or anhydride.

6. The method of claim 1 wherein the amount of polymerized unsaturated carboxylic acid or anhydride is in the range of from about 0.000001 to about 0.001 mole per gram of protein.

References Cited

UNITED STATES PATENTS

| 2,455,790 | 12/1948 | Malm et al. | 260—8 |
| 2,827,419 | 3/1958 | Tourtellotte et al. | 260—8 |
| 3,257,208 | 6/1966 | Paesschen et al. | 260—8 |
| 3,272,640 | 9/1966 | Geurden | 260—119 |
| 3,330,664 | 7/1967 | Minsk et al | 260—117 |
| 3,502,545 | 3/1970 | Westman et al. | 260—112 R |

NORMAN YUDKOFF, Primary Examiner

C. P. RIBANDO, Assistant Examiner

U.S. Cl. X.R.

99—14; 260—8